United States Patent [19]
White

[11] 3,854,135
[45] Dec. 10, 1974

[54] LOW ANGLE RADAR TRACKING SYSTEM

[75] Inventor: Warren D. White, Northport, N.Y.

[73] Assignee: The United States of America as represented by the Secretary of the Navy, Washington, D.C.

[22] Filed: Nov. 9, 1973

[21] Appl. No.: 414,465

[52] U.S. Cl............................. 343/16 M, 343/7 TA
[51] Int. Cl............................................... G01s 9/22
[58] Field of Search............ 343/16 M, 16 R, 16 LS, 343/7 TA, 7 A, 17.1 R, 100 SA

[56] References Cited
UNITED STATES PATENTS

| | | | |
|---|---|---|---|
| 3,197,776 | 7/1965 | Winn............................. | 343/16 M X |
| 3,720,941 | 3/1973 | Ares.................................. | 343/7 A |
| 3,757,326 | 9/1973 | White............................... | 343/7 A |
| 3,778,824 | 12/1973 | Roger................................ | 343/7 A |
| 3,778,827 | 12/1973 | Strenglein..................... | 343/16 M X |
| 3,781,878 | 12/1973 | Kirkpatrick................... | 343/7 TA X |
| 3,795,913 | 3/1974 | Kosowsky et al. .............. | 343/16 M |

*Primary Examiner*—T. H. Tubbesing
*Assistant Examiner*—G. E. Montone
*Attorney, Agent, or Firm*—R. S. Sciascia; L. I. Shrago

[57] ABSTRACT

The elevation angle of a target which is at a low altitude over a reflecting surface is ascertained by receiving both direct and reflected radar signals on a pair of fixed directional beams which have patterns such that their ratio has even order symmetry about a horizontal axis. The ratio of the total signals received on these beams is indicative of this angle.

8 Claims, 5 Drawing Figures

LOW ANGLE RADAR TRACKING SYSTEM

The present invention relates generally to radar system and, more particularly, to a method of and an apparatus for tracking targets which are at low altitudes.

When a conventional tracking radar follows a target to a low altitude over water, it experiences difficulty when the target is within about a beam width of the horizon. This is caused by the disruptive effects of the signal which enters the antenna system after having been reflected from the sea surface. In applicant's U.S. Pat. No. 3,757,326 of Sept. 4, 1973, there is disclosed an arrangement which may be utilized to eliminate this source of error. Briefly, the solution involves a modified difference pattern in a monopulse radar system which has a second auxilary null that is independently steerable. Although this approach is well suited for continuous target tracking applications and may be employed with both phased array radars and radars using mechanical scan, it is basically a null balance system in which maximum accuracy is not achieved until the radar has gone through an iterative settling process. In some multi-target applications, however, the time budget precludes such a settling process, and it is necessary that angle data be reported on the basis of single pulse observations.

It is, accordingly, a primary object of the present invention to provide a method for determining the elevation angle of a target which is at a relatively low altitude above the sea surface which requires only a single pulse observation.

Another object of the present invention is to provide a method for determining the elevation angle of a radar target which utilizes fixed beams.

Another object of the present invention is to provide a method for determining the elevation angle of a relatively low target which involves measuring the voltage radio of a signal simultaneously received on two antenna patterns whose ratio satisfies a certain symmetry condition.

Other objects, advantages and novel features of the invention will become apparent from the following detailed description of the invention when considered in conjunction with the accompanying drawings wherein.

In order to obtain an understanding of the operating principle of the present invention, consider the case of an antenna with two separate patterns A and B which are subject to the symmetry constraint set out in the following equation:

$$F_B(u)/F_A(u) = F_B(-u)/F_A(-u)$$

1.

where
$u = \pi D/\lambda \sin \phi$
$D$ = aperture dimension
$\lambda$ = wavelength
$\phi$ = elevation angle the symmetry condition is not imposed on the individual patterns, but it is required that the ratio of the two patterns have even-order symmetry.

It is assumed that the direct and reflected ray arrive with equal and opposite elevation angles. The total signal received on the A beam can then be written as:

$$V_A = E_S [ F_A(u) + \rho e^{i\psi} F_A(-u) ]$$

2.

Here
$E_S$ = amplitude of the signal as it would be received in free space on a unit gain antenna.
$\rho$ = reflection coefficient of the smooth sea.
$\Psi$ = phase angle of the reflected wave relative to the direct wave as seen at the aperture center. This includes the phase of the reflection itself and the effect of path length difference.

Similarly, the signal received on the B beam is:

$$V_B = E_S [F_B(u) + \rho e^{i\psi} F_B(-u) ]$$

3.

The ratio of these two voltages is then:

$$(V_B/V_A) = (F_B(u) + \rho e^{i\psi} F_B(-u))/F_A(u) + \rho e^{i\psi} F_A(-u))$$

4.

This expression may be factored so:

$$V_B/V_A = F_B(u)/F_A(u) [ 1 + \rho e^{i\psi} F_B(-u)/F_B(u)/1 + \rho e^{i\psi} F_A(-u)/F_A(u) ]$$

5.

Note, however, that upon transposing equation (1) we obtain:

$$F_B(-u)/F_B(u) = F_A(-u)/F_A(u)$$

6.

Making this substitution in equation (5), it is found that for the expression within the brackets, [ ], the numerator and denominator are equal. The result is simply:

$$V_B/V_A = F_B(u)/F_A(u)$$

7.

Thus, it is seen that if the shape of the antenna patterns is known and the voltage ratio $V_B/V_A$ is measured, the elevation angle can be deduced independently of the reflection.

Figure 1:
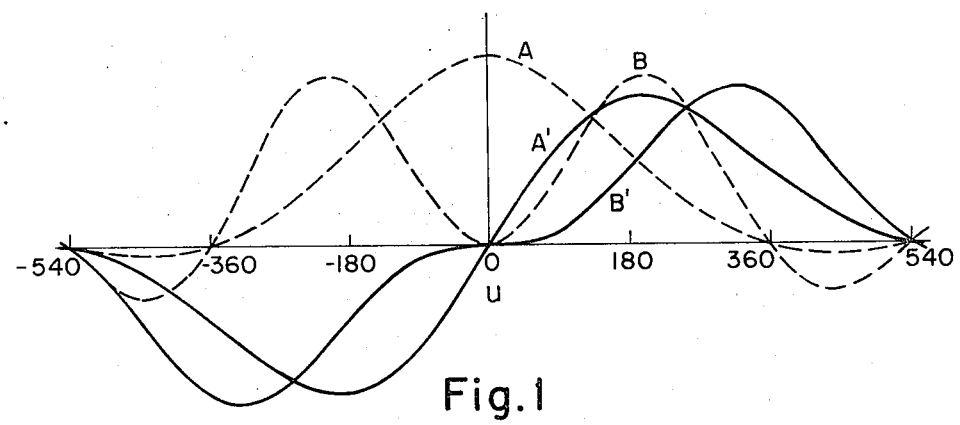
FIG. 1 illustrates selective A and B antenna patterns which are helpful in understanding the operating principle of the present invention.
Figure 2:
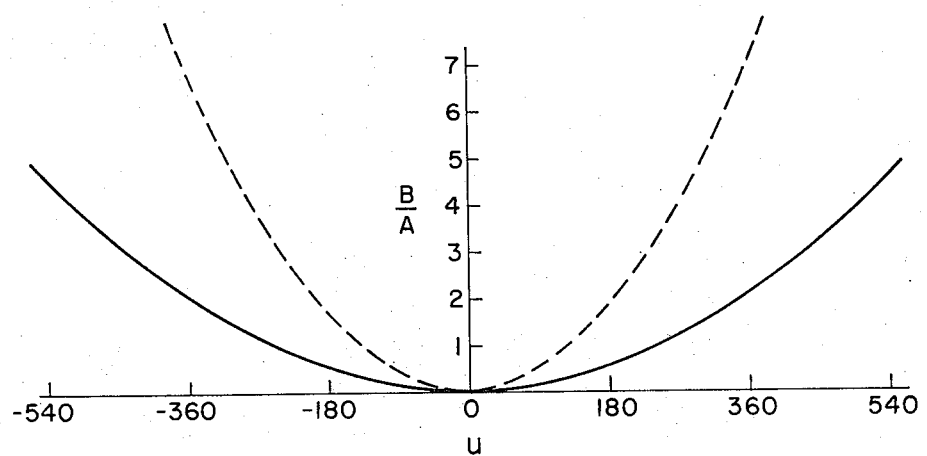
FIG. 2 is a plot of the ratio of these patterns.

Referring now to FIG. 1 of the drawings, there is shown a first pair of A and B antenna patterns which have even order symmetry about the horizon as represented here by the vertical axis. Their ratio B/A, as shown in FIG. 2, of necessity has the same type of symmetry. In this particular case, the ratio is proportional to $ku^2$. However, this proportion is merely shown for convenience and does not constitute a limitation on the operating principle of the invention. In this respect, the only requirement is that each value of the ratio should correspond to only one positive value in the main beam region to prevent any ambiguous elevation angle determination. The angular scale used in these FIGS. is the normalized angular parameter $u$, above defined.

FIG. 1 also contains a second pair of antenna patterns, A' and B', which have odd symmetry. However, as shown in FIG. 2, their ratio still has the required even symmetry. Although only a limited number of patterns are shown in FIG. 1, it would be pointed out that it is possible to have A and B antenna patterns each of which is unsymmetrical but still possesses the necessary even order ratio symmetry required. For example, the linear superpositioning of A and A' and B and B' would produce such a result.

Figure 3:
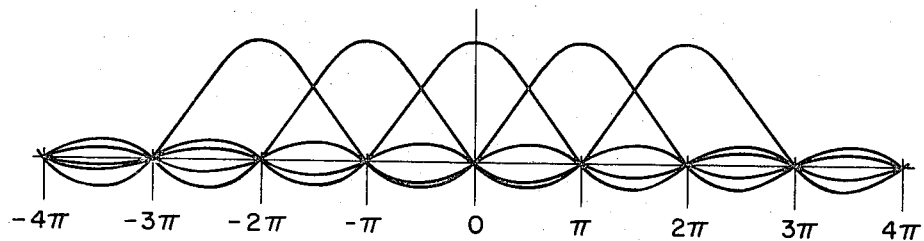
FIG. 3 depicts some of the individual sin X/X beams from which the A and B patterns may be synthesized.

The A and B patterns above described may, for example, be obtained by a synthesizing operation. More specifically, these patterns may be derived by superpositioning the weighted sum of orthogonal patterns of the sin X/X type, as shown in FIG. 3. Each of these individual patterns, as is well known, is characteristic of the radiation from a uniformly illuminated rectangular aperture. Three of these patterns were used to form A and B, and they had the relative weights, respectively, of 1, 2, 1 and 1, 0, 1. The A' and B' patterns were obtained from five such orthogonal patterns with the A' having relative weights of 2, 4, 0, $-4$, $-2$ and the B', 8, 4, 0, $-4$, $-8$.

Figure 4:
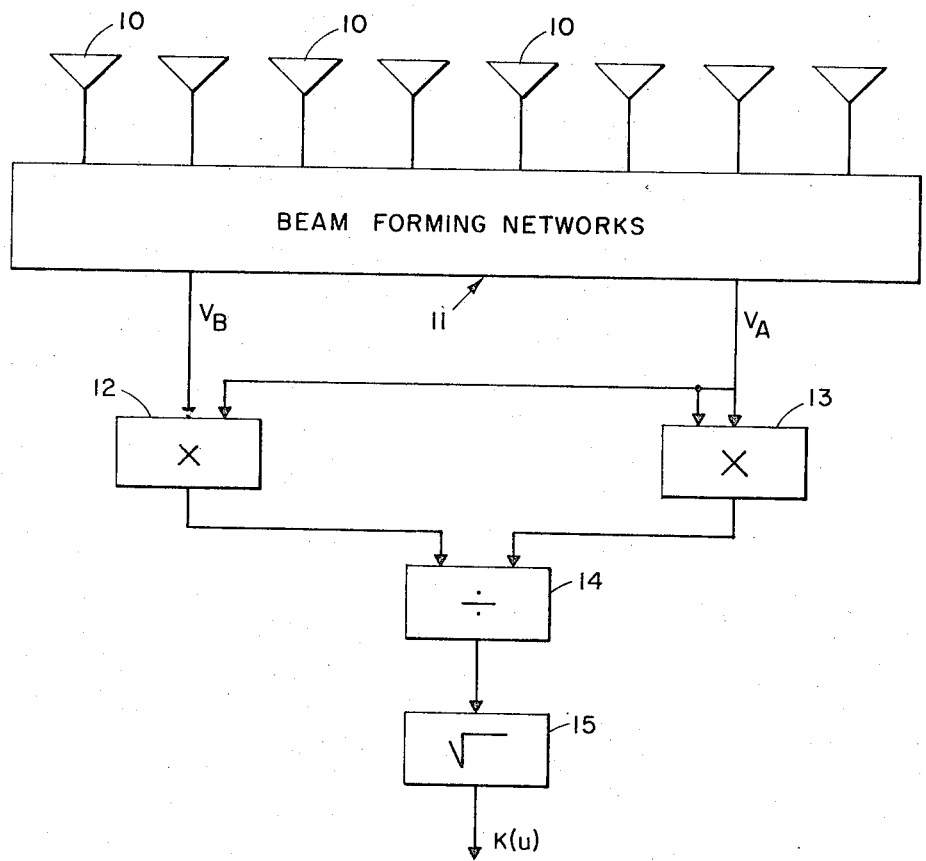
FIG. 4 is a simplified schematic diagram showing how the elevation angle may be obtained when the ratio has a parabolic shape.

FIG. 4 shows a simplified arrangement for ascertaining the elevation angle where the ratio has a parabolic shape and is proportional to $ku^2$. Here the individual detecting elements 10 of a suitable array are coupled after appropriate preamplification, not shown, to a beam-forming network 11 which develops the A and B patterns. The construction of such a network is well known in the art and may comprise suitable phase shifters, hybrid couplers, amplifiers and resistive mixing networks.

The output of the B pattern, $V_B$, is fed to a multiplier 12 which has as its other input the output from the A pattern. This multiplication yields the quantity $V_A V_B \cos(\theta_1 - \theta_2)$. The output from the A pattern, $V_A$, is multiplied by itself in multiplier 13 to yield the quantity $V_A^2$. Thereafter, signals from the multipliers are sent to a divider 14 which produces $V_B/V_A \cos(\theta_1 - \theta_2)$. This signal, in turn, is sent to a square root ciruit which produces the output signal, $ku$, which is indicative of the elevation angle.

The accuracy of the beam system above described, which is a rather complicated function of, among other things, the actual target angle and the relative phase between the direct and reflected signal, may be improved by squinting or elevating the A beam above the horizon.

Figure 5:
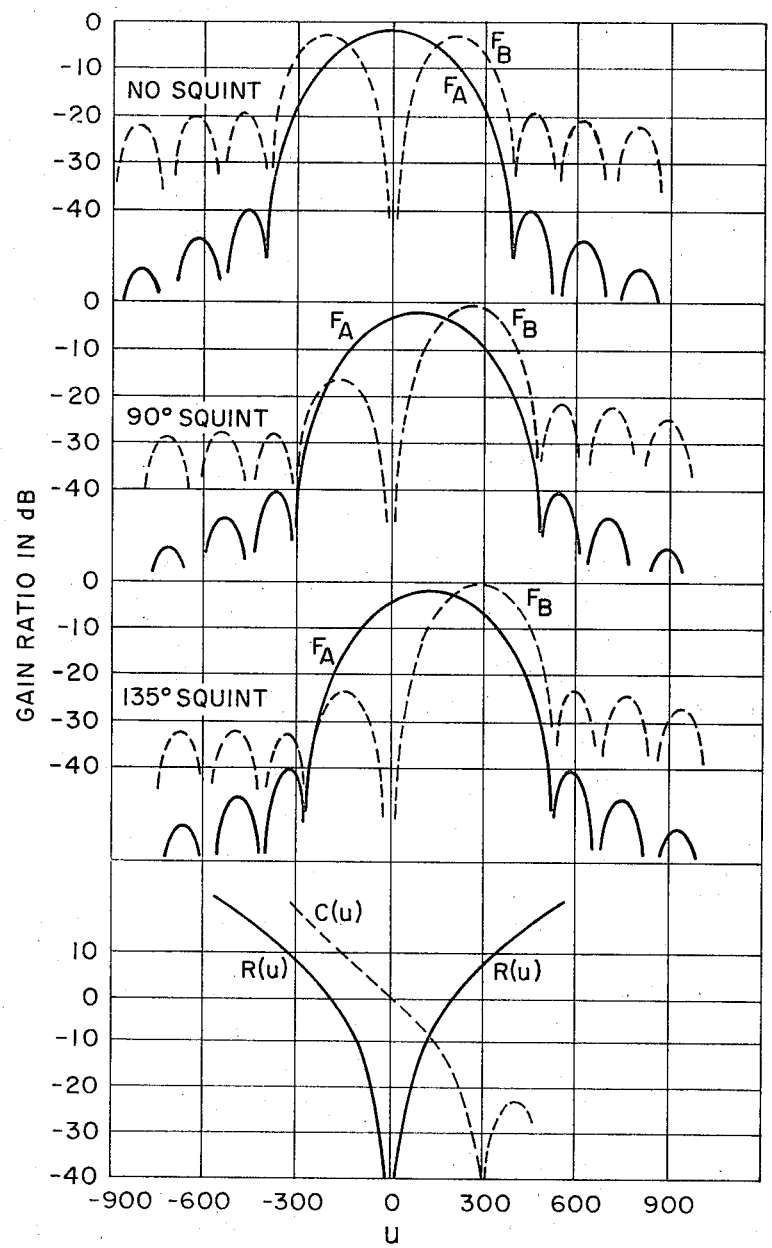
FIG. 5 is a series of patterns illustrating how the A pattern may be squinted above the horizon to improve the performance of the system.

FIG. 5 shows a set of A and B patterns where the A beam of each pair has the same shape, but in successive showings from the top of the FIG. down, the peak is displaced upwardly, first by 90° then by 135°. The B beams change shape from pair to pair, but for each pair, the beam ratio $R(u)$ is a parabolic function of elevation. The vertical scale in this showing is in db, and this accounts for the appearance of this curve. Additionally, $C(u)$ which is the ratio of $F_A(-u)/F_A(u)$ is also plotted. This ratio, which is indicative of the error in the system, should be as small as possible. This is one of the reasons for orientating the peak of the A beam above the horizon.

It can be shown that as the squint is increased, the sensitivity of the system to relative phase is reduced. This is due to the fact that the higher squints discriminate against the reflected signal. However, at the higher squints there is a loss in gain on the direct signal. Over most of the low angle range, a relatively small squint in the neighborhood of $u_s = 45°$ or 0.25 standard beam width yields the least error. At the higher elevations of one beam width or above, the optimum squint becomes greater. Thus, the radar system may utilize a bottom row of beam positions having a 45° squint followed by a second row having a squint of 180° or more. The third and higher rows could revert to standard monopulse operation.

What is claimed is:

1. In a method for determining by radar the elevation angle of a target which is at a relatively low altitude so that both direct and reflected radar signals are returned to the radar site, the steps of receiving said direct and reflected radar signals on a pair of directional beams which have patterns and are orientated such that their ratio has even order symmetry with respect to a horizontal axis; and determining the ratio of the signals received on said pair of directional beams, said ratio being indicative of said elevation angle.

2. In a method as defined in claim 1 wherein the ratio of said beam patterns has a parabolic shape.

3. In a method as defined in claim 2 wherein the square root of the ratio of the signals is determined.

4. In a method as defined in claim 1 wherein one of said directional beams is squinted upwardly with respect to said horizontal axis so as to discriminate in favor of the direct signal arriving at said radar site.

5. In a method for determining the elevation angle of a target which employs radar and wherein direct and reflected radar signals arrive back at the radar site, the steps of forming a pair of directional beams in space which have patterns that over their main beam areas have even order symmetry with respect to an axis;

orientating said directional beams such that this axis is horizontal;

receiving both the direct and reflected radar signals from said target on this pair of beams; and measuring the ratio of the signals so received, said ratio being indicative of the elevation angle.

6. In a method as defined in claim 5 wherein each value of the ratio corresponds to only one positive value in the main beam region.

7. Apparatus for determining the elevation angle of a low altitude target which is above a reflecting surface so that radar signals striking said target produce direct and reflected radar signals back at the radar site, the combination of means for forming a pair of directional beams which have patterns such that over the main beam regions the ratio of these patterns has even order symmetry with respect to a horizontal direction;

means for receiving said direct and reflected radar signals on each beam; and means for measuring the ratio of the signals so received, said ratio providing an indication of the elevation angle.

8. In an arrangement as defined in claim 7 wherein the ratio of said patterns has a parabolic shape; and means for obtaining the square root of the ratio of the radar signals.

* * * * *